United States Patent
Bostick et al.

(10) Patent No.: US 10,409,285 B2
(45) Date of Patent: Sep. 10, 2019

(54) MANAGING AUTONOMOUS VEHICLES NEEDING ENERGY REPLENISHMENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/837,278

(22) Filed: Dec. 11, 2017

(65) Prior Publication Data

US 2018/0113464 A1 Apr. 26, 2018

Related U.S. Application Data

(63) Continuation of application No. 15/270,908, filed on Sep. 20, 2016, now Pat. No. 10,216,190.

(51) Int. Cl.
*G05D 1/00* (2006.01)
*G05D 1/02* (2006.01)
(Continued)

(52) U.S. Cl.
CPC ....... *G05D 1/0217* (2013.01); *G01C 21/3469* (2013.01); *G05D 1/0088* (2013.01);
(Continued)

(58) Field of Classification Search
CPC ...... G06Q 10/04; G08G 1/22; G05C 21/3469; G05D 1/0088; G05D 1/0217; G05D 2201/0213; G05D 1/0297
(Continued)

(56) References Cited

U.S. PATENT DOCUMENTS 7,181,409 B1 2/2007 Murakami et al.
8,352,112 B2 * 1/2013 Mudalige ................. G08G 1/22
340/435
(Continued)

FOREIGN PATENT DOCUMENTS

CN 107745823 A * 3/2018
CN 107745823 A 3/2018
(Continued)

OTHER PUBLICATIONS

UAV-Assisted RF Energy Transfer; Suraj Suman ; Sidharth Kumar ; Swades De; 2018 IEEE International Conference on Communications (ICC); pp. 1-6, year 2018.*
(Continued)

*Primary Examiner* — Cuong H Nguyen
(74) *Attorney, Agent, or Firm* — Yee & Associates, P.C.; Daniel Simek

(57) ABSTRACT

Managing autonomous vehicles is provided. Autonomous vehicle energy data and travel data are collected. A plurality of autonomous vehicles that need energy replenishment within a defined geographic area is determined. A rank is determined for each of the plurality of autonomous vehicles that need energy replenishment within the defined geographic area to meet passenger-defined travel destination time constraints. Each autonomous vehicle is directed to an energy station in a set of energy stations within the defined geographic area to the meet passenger-defined travel destination time constraints based on the rank of each of the plurality of autonomous vehicles.

13 Claims, 9 Drawing Sheets

(51) Int. Cl.
  *G01C 21/34* (2006.01)
  *G06Q 50/06* (2012.01)
  *G06Q 50/30* (2012.01)
  *G06Q 10/06* (2012.01)
  *G06Q 10/04* (2012.01)
(52) U.S. Cl.
  CPC ......... *G05D 1/0285* (2013.01); *G05D 1/0297* (2013.01); *G06Q 10/04* (2013.01); *G06Q 10/06313* (2013.01); *G06Q 50/06* (2013.01); *G06Q 50/30* (2013.01); *G05D 2201/0213* (2013.01)
(58) Field of Classification Search
  USPC ..... 320/109; 701/11, 222–25, 300; 342/457, 342/458
  See application file for complete search history.

(56) References Cited

U.S. PATENT DOCUMENTS

| | | | |
|---|---|---|---|
| 9,070,101 | B2 | 6/2015 | Abhyanker |
| 9,254,363 | B2 | 2/2016 | Levien et al. |
| 9,317,033 | B2 | 4/2016 | Ibanez-Guzman et al. |
| 9,373,149 | B2 | 6/2016 | Abhyanker |
| 9,384,668 | B2 | 7/2016 | Raptopoulos et al. |
| 9,409,646 | B2 | 8/2016 | Fleck |
| 9,542,821 | B2* | 1/2017 | Watanabe ............... G08B 13/00 |
| 9,573,684 | B2 | 2/2017 | Kimchi et al. |
| 9,713,675 | B2* | 7/2017 | Levien ................. G05D 1/0011 |
| 9,718,544 | B2 | 8/2017 | Fleck |
| 9,892,296 | B2 | 2/2018 | Kovarik et al. |
| 2007/0218878 | A1* | 9/2007 | Khawand ............ H04M 1/6016 455/414.1 |
| 2010/0256852 | A1 | 10/2010 | Mudalige |
| 2011/0060521 | A1* | 3/2011 | Watkins ............. G01C 21/3469 701/469 |
| 2012/0227926 | A1 | 9/2012 | Field et al. |
| 2014/0024999 | A1 | 1/2014 | Levien et al. |
| 2014/0025229 | A1 | 1/2014 | Levien et al. |
| 2014/0025234 | A1 | 1/2014 | Levien et al. |
| 2014/0025235 | A1 | 1/2014 | Levien et al. |
| 2014/0025236 | A1 | 1/2014 | Levien et al. |
| 2014/0032034 | A1 | 1/2014 | Raptopoulos et al. |
| 2014/0067159 | A1 | 3/2014 | Levien et al. |
| 2014/0067160 | A1 | 3/2014 | Levien et al. |
| 2014/0067167 | A1* | 3/2014 | Levien ................. G05D 1/0011 701/3 |
| 2014/0330460 | A1* | 11/2014 | Schoonmaker ......... B61C 17/12 701/19 |
| 2015/0202976 | A1 | 7/2015 | Bridges et al. |
| 2015/0258910 | A1 | 9/2015 | Fukui et al. |
| 2015/0338852 | A1 | 11/2015 | Ramanujam |
| 2016/0070260 | A1* | 3/2016 | Levien ..................... G05D 1/00 701/3 |
| 2016/0193932 | A1* | 7/2016 | Vaghefinazari ....... H02J 7/0021 320/109 |
| 2017/0187074 | A1* | 6/2017 | Sebastian .......... H01M 10/4207 |
| 2018/0335515 | A1* | 11/2018 | Eberle ................ G01S 13/9303 |

FOREIGN PATENT DOCUMENTS

| | | | |
|---|---|---|---|
| GB | 002358843 A | * | 8/2001 |
| GB | 2358843 A | | 8/2001 |

OTHER PUBLICATIONS

Low-cost AUV . . . suitable for combining with an USV as autonomous automatic recharging platform; Javier Busquets et al.; 2012 IEEE/OES Autonomous Underwater Vehicles (AUV); pp. 1-10; Year: 2012 P.*
Suman et al., "UAV-Assisted RF Energy Transfer," IEEE International Conference on Communications (ICC), May 20-24, 2018, Kansas City, MO, pp. 1-6.
Busquets et al., "Low-Cost AUV Based on Arduino Open Source Microcontroller Board for Oceanographic Research Applications in a Collaborative Long Term Deployment Missions and Suitable for Combining With an USV as Autonomous Automatic Recharging Platform," IEEE/OES Autonomous Underwater Vehicles (AUV), Southampton, UK, Sep. 24-27, 2012, pp. 1-10.
Notice of Allowance, dated Oct. 15, 2018, regarding U.S. Appl. No. 15/270,908, 14 pages.
Barco et al., "Optimal Routing and Scheduling of Charge for Electric Vehicles : Case Study," Universidad de los Andes, Oct. 2013, 21 pages.
Carter, "Tesla's new battery swap station will give electric vehicles a full charge in 3 minutes flat," Inhabitat, Dec. 27, 2014, 2 pages. http://inhabitat.com/tesla-launches-battery-swap-program-that-only-needs-3-minutes-for-a-full-charge/.
Mell et al., "The NIST Definition of Cloud Computing," National Institute of Standards and Technology Special Publication 800-145, Sep. 2011, 7 pages.
Bostick et al., "Managing Autonomous Vehicles Needing Energy Replenishment", filed Sep. 20, 2016, U.S. Appl. No. 15/270,908, 46 pages.
List of IBM Patents and Applications Treated as Related, dated Dec. 8, 2017, 2 pages.

* cited by examiner

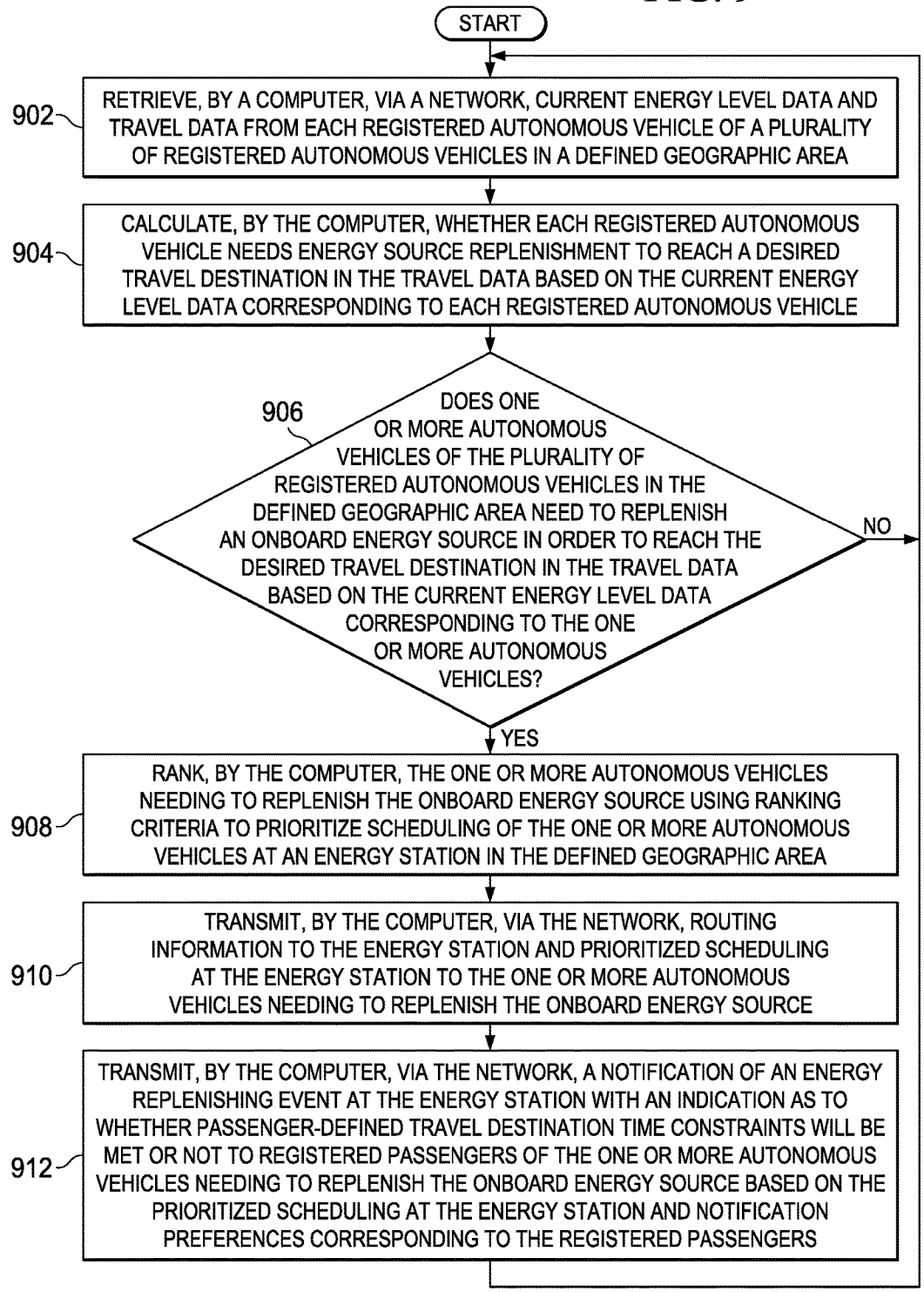

US 10,409,285 B2

MANAGING AUTONOMOUS VEHICLES NEEDING ENERGY REPLENISHMENT

BACKGROUND

1. Field

The disclosure relates generally to autonomous vehicles and more specifically to managing multiple registered autonomous vehicles needing to replenish an onboard energy source within a defined geographic area and directing the autonomous vehicles to selected energy stations that will minimize energy replenishment times to meet passenger-defined travel destination time constraints.

2. Description of the Related Art

For the past many years, innovations within the automotive industry have created safer, cleaner, and more affordable vehicles. Now, the automotive industry is moving toward autonomous vehicle technology. An autonomous vehicle is capable of sensing its environment and navigating without human input. Autonomous vehicles can detect surroundings using a variety of technologies, such as, for example, radar, light detection and ranging (LIDAR), global positioning system (GPS) technology, odometry, and computer vision. Advanced control systems interpret the sensory information provided by these various technologies to identify appropriate navigation paths, as well as, obstacles and relevant signage. Autonomous vehicles utilize these advanced control systems to distinguish between different vehicles on a roadway and determine a path to a desired destination. In addition, autonomous vehicles offer possible benefits to social welfare, such as, for example, saving lives; reducing crashes, traffic congestion, fuel consumption, and pollution; increasing mobility of disabled individuals; and allowing vehicle passengers to spend travel time engaged in other activities. Examples of autonomous vehicles may be, for example, cars, taxis, buses, vans, sport utility vehicles, trucks, semi-tractor trailers, and the like.

SUMMARY

According to one illustrative embodiment, a computer-implemented method for managing autonomous vehicles is provided. A computer collects autonomous vehicle energy data and travel data. The computer determines a plurality of autonomous vehicles that need energy replenishment within a defined geographic area. The computer determines a rank for each of the plurality of autonomous vehicles that need energy replenishment within the defined geographic area to meet passenger-defined travel destination time constraints. The computer directs each autonomous vehicle to an energy station in a set of energy stations within the defined geographic area to meet the passenger-defined travel destination time constraints based on the rank of each of the plurality of autonomous vehicles.

BRIEF DESCRIPTION OF THE DRAWINGS

FIG. 9 is a flowchart illustrating a process for managing autonomous vehicles that need to replenish an onboard energy source within a defined geographic area in accordance with an illustrative embodiment.

DETAILED DESCRIPTION

Figure 1:
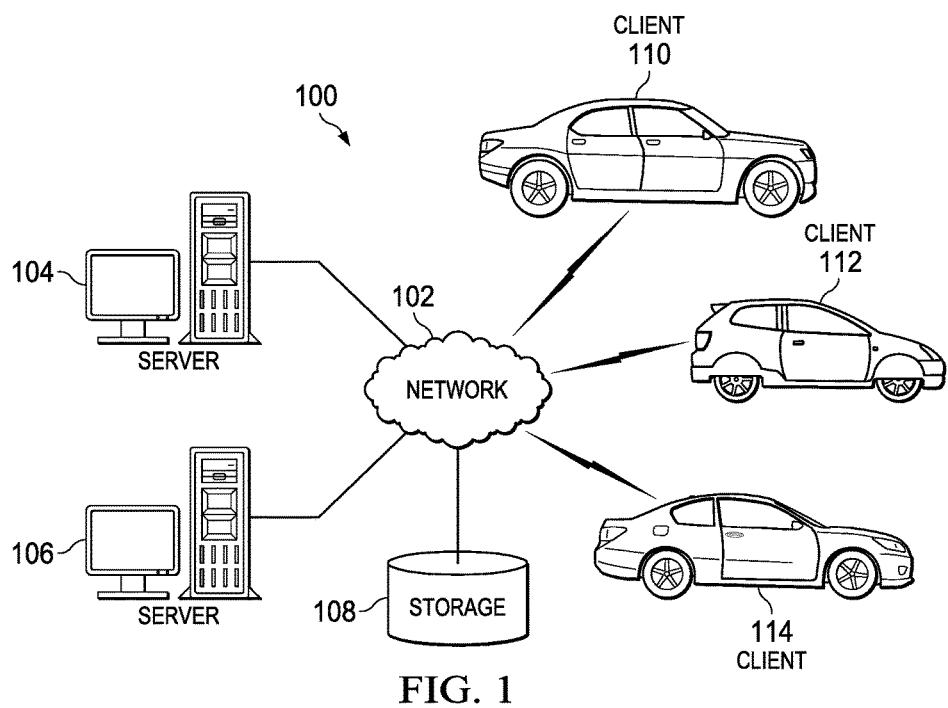
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide, for example, a set of services that manage a plurality of registered autonomous vehicles needing to replenish an onboard energy source within a defined geographic area. In addition, the set of services may direct the registered autonomous vehicles in need of replenishing the onboard energy source to one or more selected energy stations that will minimize energy replenishment times to meet travel destination time constraints defined by passengers of the registered autonomous vehicles.

Client 110, client 112, and client 114 also connect to network 102. Clients 110, 112, and 114 represent autonomous vehicles that include onboard data processing systems, which are registered clients of the autonomous vehicle energy management services provided by server 104 and server 106. The registered autonomous vehicles may be any type of autonomous vehicle, such as, for example, cars, vans, sport utility vehicles, trucks, semi-tractors, taxis, buses, and the like. Further, the registered autonomous vehicles may include electric motor vehicles and combustion engine vehicles. Furthermore, the registered autonomous vehicles may include manned autonomous vehicles, which may include semi-autonomous vehicles that may or may not require human intervention, and unmanned autonomous vehicles, which do not require human intervention.

It should be noted that the data processing systems of clients 110, 112, and 114 may be coupled, via wired or wireless communication links, to other data processing systems, such as, for example, laptop computers, tablet computers, handheld computers, smart phones, smart watches, personal digital assistants, gaming devices, and the like, which occupants of the registered autonomous vehicles are utilizing while traveling in the registered autonomous vehicles. Further, server 104 and server 106 also may provide information, such as boot files, operating system images, software applications, maps, routing data, and notifications to clients 110, 112, and 114.

Storage 108 is a network storage device capable of storing any type of data in a structured format or an unstructured format. Data stored in storage 108 may include, for example, lists of registered autonomous vehicles with respective registration and specification information, lists of autonomous vehicle passengers with registration information and notification preferences, geographic area definitions, ranking criteria, and lists of energy replenishment stations with locations and available queue times. Further, storage 108 may store other types of data, such as authentication or credential data that may include user names, passwords, and biometric data associated with system administrators and users.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to a data processing system of client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
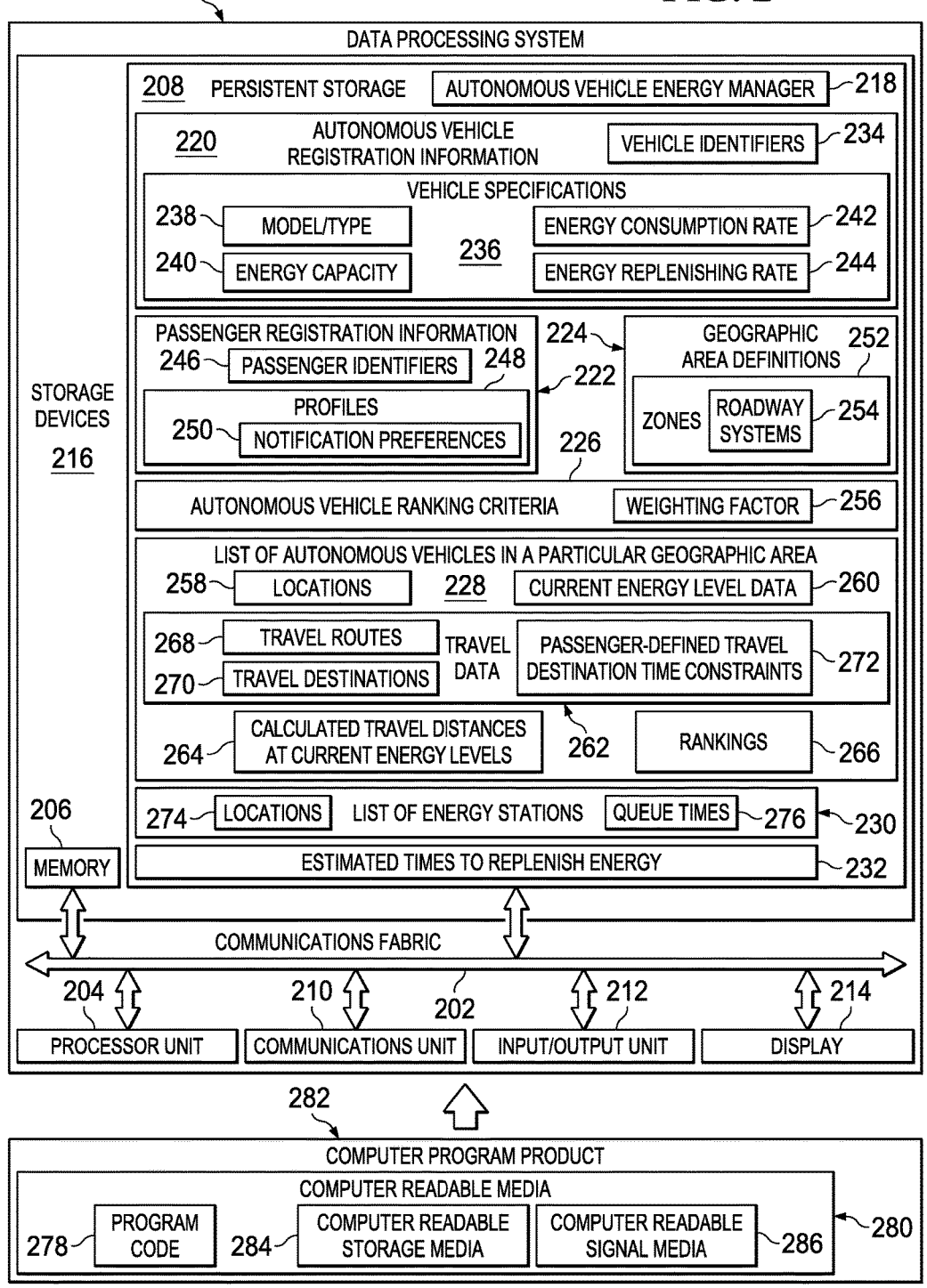
FIG. 2 is a diagram of a data processing system in which illustrative embodiments may be implemented.

With reference now to FIG. 2, a diagram of a data processing system is depicted in accordance with an illustrative embodiment. Data processing system 200 is an example of an autonomous vehicle energy replenishment management computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores autonomous vehicle energy manager 218. Autonomous vehicle energy manager 218 monitors and manages a plurality of registered autonomous vehicles, which are in need of replenishing an onboard energy source, within a defined geographic area and directs the registered autonomous vehicles in need of energy replenishment to one or more selected energy stations that will minimize energy replenishment times to meet passenger-defined travel destination time constraints. It should be noted that even though autonomous vehicle energy manager 218 is illustrated as residing in persistent storage 208, in an alternative illustrative embodiment autonomous vehicle energy manager 218 may be a separate component of data processing system 200. For example, autonomous vehicle energy manager 218 may be a hardware component coupled to communication fabric 202 or a combination of hardware and software components.

In this example, persistent storage 208 also stores autonomous vehicle registration information 220, passenger registration information 222, geographic area definitions 224, autonomous vehicle ranking criteria 226, list of autonomous vehicles in a particular geographic area 228, list of energy stations 230, and estimated times to replenish energy 232. However, it should be noted that different illustrative embodiments may store more or less information in persistent storage 208 than illustrated.

In this example, autonomous vehicle registration information 220 includes vehicle identifiers 234 and vehicle specifications 236. Autonomous vehicle energy manager 218 utilizes vehicle identifiers 234 to uniquely identify each registered autonomous vehicle. Autonomous vehicle energy manager 218 utilizes vehicle specifications 236 to determine model/type 238, energy capacity 240, energy consumption rate 242, and energy replenishment rate 244 of each registered autonomous vehicle. Vehicle specifications 236 may include other information, such as vehicle weight, battery type, fuel type, expected mileage, onboard data processing system and/or navigation system identifiers, and the like. Autonomous vehicle energy manager 218 may receive vehicle specifications 236 from one or more autonomous vehicle manufacturers, for example.

In this example, passenger registration information 222 includes passenger identifiers 246 and profiles 248. Autonomous vehicle energy manager 218 utilizes passenger identifiers 246 to uniquely identify each registered passenger of registered autonomous vehicles. Profiles 248 represent a plurality of different passenger profiles, which correspond to respective registered passengers. In this example, profiles 248 include notification preferences 250. Notification preferences 250 represent how particular registered passengers wish to receive notifications from autonomous vehicle energy manager 218. For example, a registered passenger may prefer to receive textual notifications from autonomous vehicle energy manager 218 on a cellular telephone corresponding to the registered passenger, whereas another registered passenger may prefer to receive voice notifications from autonomous vehicle energy manager 218 via a navigation system of an autonomous vehicle that the registered passenger is traveling in. Profiles 248 also may include other information, such as, for example, demographic information, place of residence, place of work, locations frequently visited, and the like, corresponding to respective registered passengers.

Geographic area definitions 224 define each geographic area in a set of one or more geographic areas that autonomous vehicle energy manager 218 monitors and manages registered autonomous vehicles, which are located within the set of geographic areas. Each defined geographic area may be divided into zones 252. Zones 252 represent a set of two or more zones that subdivide a particular geographic area. Zones 252 include roadway systems 254. Roadway systems 254 represent one or more systems of roadways that vehicles travel upon within a zone or geographic area.

Autonomous vehicle energy manager 218 utilizes autonomous vehicle ranking criteria 226 and weighting factors 256 to determine a priority of registered autonomous vehicles or scheduling of registered autonomous vehicles for an energy replenishment event at a selected energy station. In other words, autonomous vehicle energy manager 218 utilizes autonomous vehicle ranking criteria 226 and weighting factors 256 to determine a queue time for each respective registered autonomous vehicle needing to replenish an onboard energy source at one or more selected energy stations.

Autonomous vehicle energy manager 218 utilizes list of autonomous vehicles in a particular geographic area 228 to identify each autonomous vehicle within that particular geographic area being monitored. Locations 258 represent a current geographic location of each respective registered autonomous vehicle in the list. Current energy level data 260 represent information regarding current levels of energy of each respective registered autonomous vehicle in the list.

Autonomous vehicle energy manager 218 utilizes travel data 262 to determine travel routes 268, travel destinations 270, and passenger-defined travel destination time constraints 272 for each respective registered autonomous vehicle in the list. Autonomous vehicle energy manager 218 may receive travel data 262 from one or more passengers of each respective registered autonomous vehicle in the list via, for example, a navigation system of an autonomous vehicle. Alternatively, autonomous vehicle energy manager 218 may receive travel data 262 from a data processing system, such as a smart phone or handheld computer, utilized by a passenger of an autonomous vehicle.

Travel routes 268 represent desired routes that registered passengers wish to travel upon within the particular geographic area. Travel destinations 270 represent desired final destinations of registered passengers. Passenger-defined travel destination time constraints 272 represent times when passengers either want to arrive at a particular travel destination or must arrive at a particular travel destination (e.g., scheduled appointment time or scheduled flight departure time).

Calculated travel distances at current energy levels 264 represent calculations made by autonomous vehicle energy manager 218 to determine how far each particular autonomous vehicle in the list can travel at respective current energy levels. In addition, autonomous vehicle energy manager 218 determines rankings 266 using autonomous vehicle ranking criteria 226 for registered autonomous vehicles in the list needing to replenish an onboard energy source prior to reaching desired travel destinations based on calculated travel distances at current energy levels 264.

Autonomous vehicle energy manager 218 utilizes list of energy stations 230 to identify each particular energy station within the particular geographic area where registered autonomous vehicles may replenish energy. In this example, list of energy stations 230 includes locations 274 and queue times 276. Locations 274 represent specific geographic locations of each energy station in the list. Autonomous vehicle energy manager 218 may utilizes locations 274 to route registered autonomous vehicles in need of energy replenishment to selected energy stations. Queue times 276 represent available time slots for performing energy replenishment events. Autonomous vehicle energy manager 218 may utilizes queue times 276 to schedule registered autonomous vehicles in need of energy replenishment at one or more selected energy stations based on rankings 266 of each respective registered autonomous vehicle needing energy replenishment.

Further, autonomous vehicle energy manager 218 calculates estimated times to replenish energy 232. Estimated times to replenish energy 232 represent the time required by respective autonomous vehicles to replenish energy in order to reach desired travel destinations. Autonomous vehicle energy manager 218 may utilize estimated times to replenish energy 232 to determine scheduling of autonomous vehicles at energy stations within the particular geographic area.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 278 is located in a functional form on computer readable media 280 that is selectively removable and may be loaded onto or transferred to data processing system 200 for running by processor unit 204. Program code 278 and computer readable media 280 form computer program product 282. In one example, computer readable media 280 may be computer readable storage media 284 or computer readable signal media 286. Computer readable storage media 284 may include, for example, an optical or magnetic disc that is inserted or placed into a drive or other device that is part of persistent storage 208 for transfer onto a storage device, such as a hard drive, that is part of persistent storage 208. Computer readable storage media 284 also may take the form of a persistent storage, such as a hard drive, a thumb drive, or a flash memory that is connected to data processing system 200. In some instances, computer readable storage media 284 may not be removable from data processing system 200.

Alternatively, program code 278 may be transferred to data processing system 200 using computer readable signal media 286. Computer readable signal media 286 may be, for example, a propagated data signal containing program code 278. For example, computer readable signal media 286 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 278 may be downloaded over a network to persistent storage 208 from another device or data processing system through computer readable signal media 286 for use within data processing system 200. For instance, program code stored in a computer readable storage media in a data processing system may be downloaded over a network from the data processing system to data processing system 200. The data processing system providing program code 278 may be a server computer, a client computer, or some other device capable of storing and transmitting program code 278.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 284 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
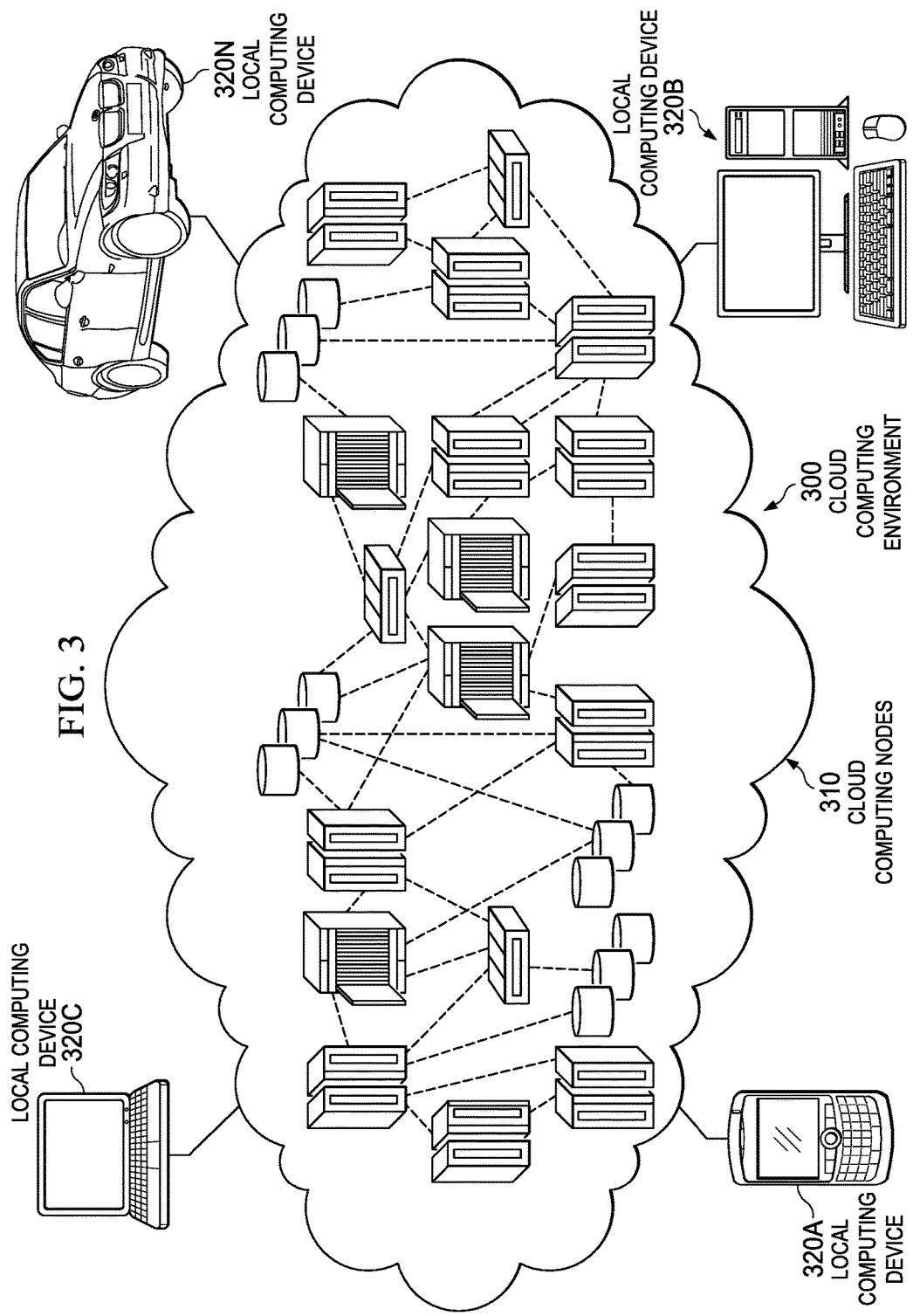
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
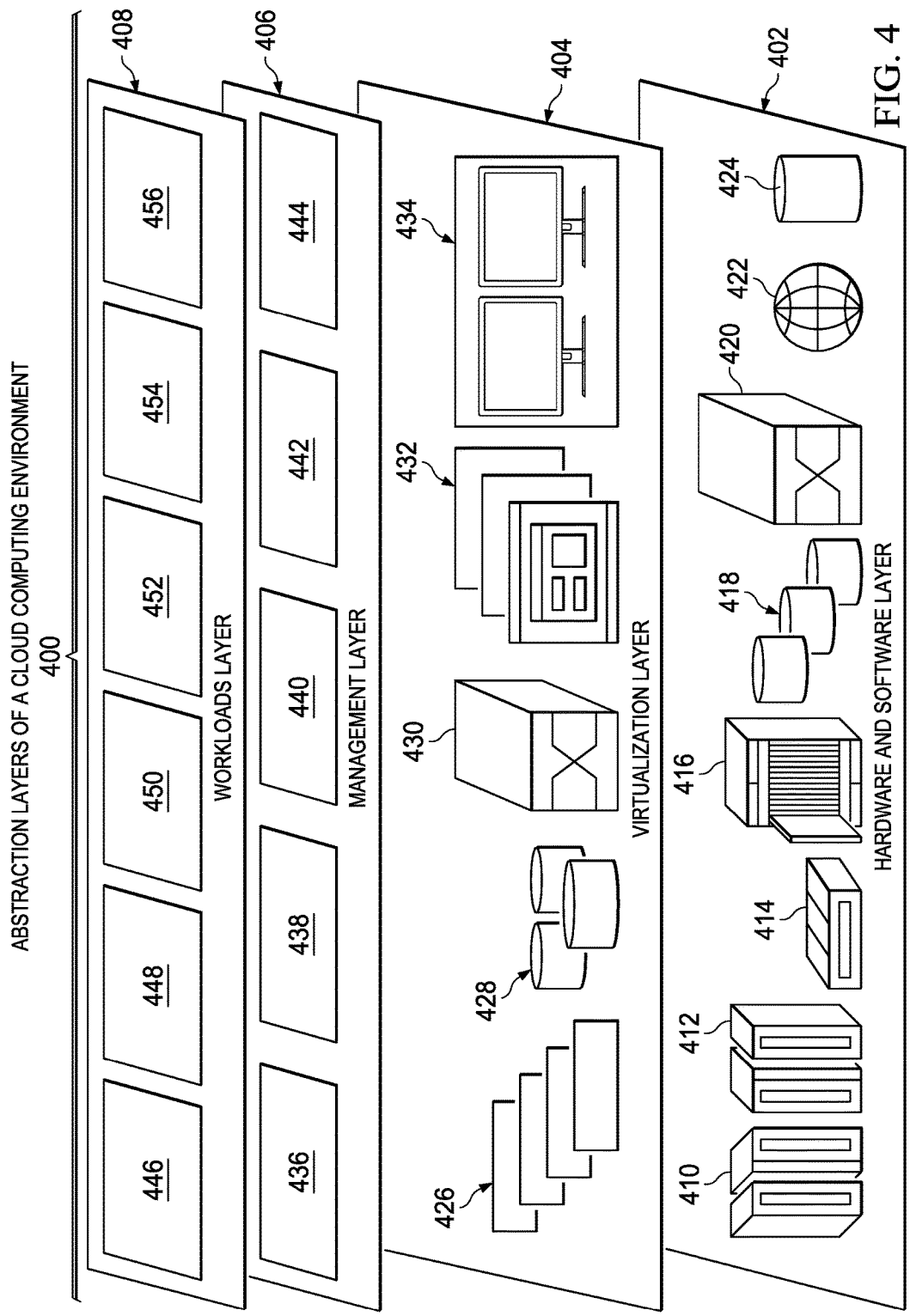
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Autonomous vehicle management 444 provides management of registered autonomous vehicles needing replenishing an onboard energy source within a defined geographic area.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and autonomous vehicle energy replenishment management processing 456.

Autonomous vehicles are often thought of as just being electric vehicles. However, an autonomous vehicle also may be powered by combustible fuel. In either case, eventually the autonomous vehicle will need to replenish the onboard energy source whether by recharging or by refueling. In the context of an autonomous vehicle with passengers, a goal of illustrative embodiments is to optimize the travel time of the autonomous vehicle such that the passenger is not in a long wait while the autonomous vehicle is being recharged or refueled.

Current technology for electric vehicles requires a significant amount of time for recharging. Thus, consideration is needed if an electric vehicle needs to be recharged or if the electric vehicle needs to wait at an energy replenishment station in a queue while other electric vehicles are recharging ahead of the electric vehicle, which could have an impact on the passenger's desired travel destination arrive time. Typically, recharging an electric car is an overnight process today. In the future, it is likely that electric cars will simply exchange one removable battery for another rather than sitting for a long period recharging.

Existing solutions for autonomous or non-autonomous vehicles determine current energy levels and identify service stations along travel paths for recharging or fueling. However, these existing solutions do not determine how long it will take for an electric vehicle to recharge given that other electric vehicles may already be recharging. In addition, these existing solutions do not determine availability of alternative recharging stations that do not have a waiting time while considering passenger-defined travel destination time constraints. Further, these existing solutions do not look at the needs of multiple electric vehicles and passengers for a coordinated and optimized recharging or refueling at service stations with a goal of expediting travel.

Illustrative embodiments provide a cloud autonomous vehicle management system to manage multiple registered autonomous vehicles in need of energy replenishment within a defined geographic area or roadway system and to select the optimal energy stations with a goal of expediting travel for passengers. Illustrative embodiments calculate and rank autonomous vehicles in need of energy replenishment and direct these autonomous vehicles to the appropriate energy station based on real time data collection, such as autonomous vehicle data collection of travel route, passenger-defined destination time constraints, autonomous vehicle power state (e.g., current energy level) and vehicle specifications (e.g., energy capacity, energy consumption rate, and energy charge rate) and energy station data collection of available queue times for energy replenishment.

In addition, it is likely that different electric vehicle manufacturers will use different battery packs for different electric vehicles. As a result, illustrative embodiments may select the relevant energy replenishment station based upon predicted availability of batteries needed for a given electric vehicle. For example, a particular make of an autonomous electric vehicle requires a compatible battery for the battery exchange. An energy station 50 miles down the road has two compatible batteries in stock now. However, illustrative embodiments know that two other electric vehicles of that same make will arrive at that particular energy station before the autonomous electric vehicle gets there. Thus, illustrative embodiments look for another energy station for the battery exchange or possibly battery recharging.

Illustrative embodiments consider several factors while determining when an autonomous vehicle should recharge or refuel. Factors that illustrative embodiments consider may include, for example: 1) current charge or fuel level and range of autonomous vehicle; 2) time of day; 3) distance the autonomous vehicle must travel on its current travel route to the desired travel destination; 4) distance the autonomous vehicle must travel on known future travel routes after arriving at the initial travel destination; 5) volume of other autonomous vehicles traveling in the same geographic area that impact travel efficiency and timing; 6) queue time and number of other autonomous vehicles at a specific recharging or fueling station to avoid travel delays; 7) rate at which the autonomous vehicle can recharge or refuel at a given service station; 8) travel route and possible recharging or refueling options; 9) centralized or distributed control of autonomous vehicles on roadway system; 10) roadway system traffic density for travel route management; 11) planned future travel consideration for miles of travel after reaching initial travel destination; and 12) partial recharging versus full recharging due to time constraints of passenger and time it takes to recharge vehicle. Further, illustrative embodiments may break the problem down by creating zones within a defined geographic area or by focusing on a roadway system that has a more defined travel path, such as, for example, a toll road with limited number of entrances and exits. Furthermore, illustrative embodiments centrally manage a wide range of registered autonomous vehicle types having various starting and ending destinations.

Illustrative embodiments provide this autonomous vehicle energy management system by: 1) collecting autonomous vehicle current energy level data and travel data, which may include travel route, travel destination, passenger-defined travel destination time constraints, and the like; 2) calculating whether autonomous vehicle energy replenishment is needed; 3) calculating a ranking of the autonomous vehicle in need of energy replenishment as compared to other autonomous vehicles needing energy replenishment in the same geographic area or zone; 4) routing the autonomous vehicle to a selected energy station while considering the passenger-defined travel destination time constraints; and 5) transmitting a notification to registered passengers of the energy replenishment event with an indication as to whether the travel destination will be reached on time or not.

Illustrative embodiments receive registration information for a plurality of autonomous vehicles. In addition, illustrative embodiments define roadway management by considering a city (i.e., a defined geographic area) with many roads as being broken up into a set of zones to centrally manage autonomous vehicle transit, communications, and energy replenishment. Further, illustrative embodiments receive energy station specifications with energy replenishment speeds and queue times for referencing. Moreover, illustrative embodiments receive ranking criteria for ranking autonomous vehicle in need of energy replenishment. Illustrative embodiments also may receive weighting factors, such as, for example: apply a weight of 40% to an autonomous vehicle that will not make current travel destination without replenishing an onboard energy source; apply a weight of 40% for passenger-defined time constraints for the current travel destination; apply a weight of 10% to an autonomous vehicle that will not make a future travel destination after arriving at the initial travel destination without replenishing an onboard energy source; and apply a weight of 10% for passenger-defined time constraints for the future travel destination.

Illustrative embodiments also receive passenger registration information that includes notification preferences of passengers. The notification preferences may be, for example, in vehicle audio, in vehicle display, instant text message, mobile application, email, and the like. Passenger-defined travel destination time constraints may be, for example, a desired arrival time, with a flexible range, such as 5-10 minutes, to arrive at a destination of home or shopping or a required arrival time for arriving at a scheduled business meeting. If an energy station stop does allow for time to make a travel destination on time, then illustrative embodiments alert the passenger, using the notification preference, that the stop will not conflict with a passenger-defined travel destination time constraint. If the energy station stop does not allow for time to make the travel destination, but the stop is required due to current energy level, then illustrative embodiments alert the passenger that the stop will conflict with the passenger-defined travel destination time constraint. The passenger at that point may choose to get out of the autonomous vehicle and walk or find another mode of transportation.

Figure 5:
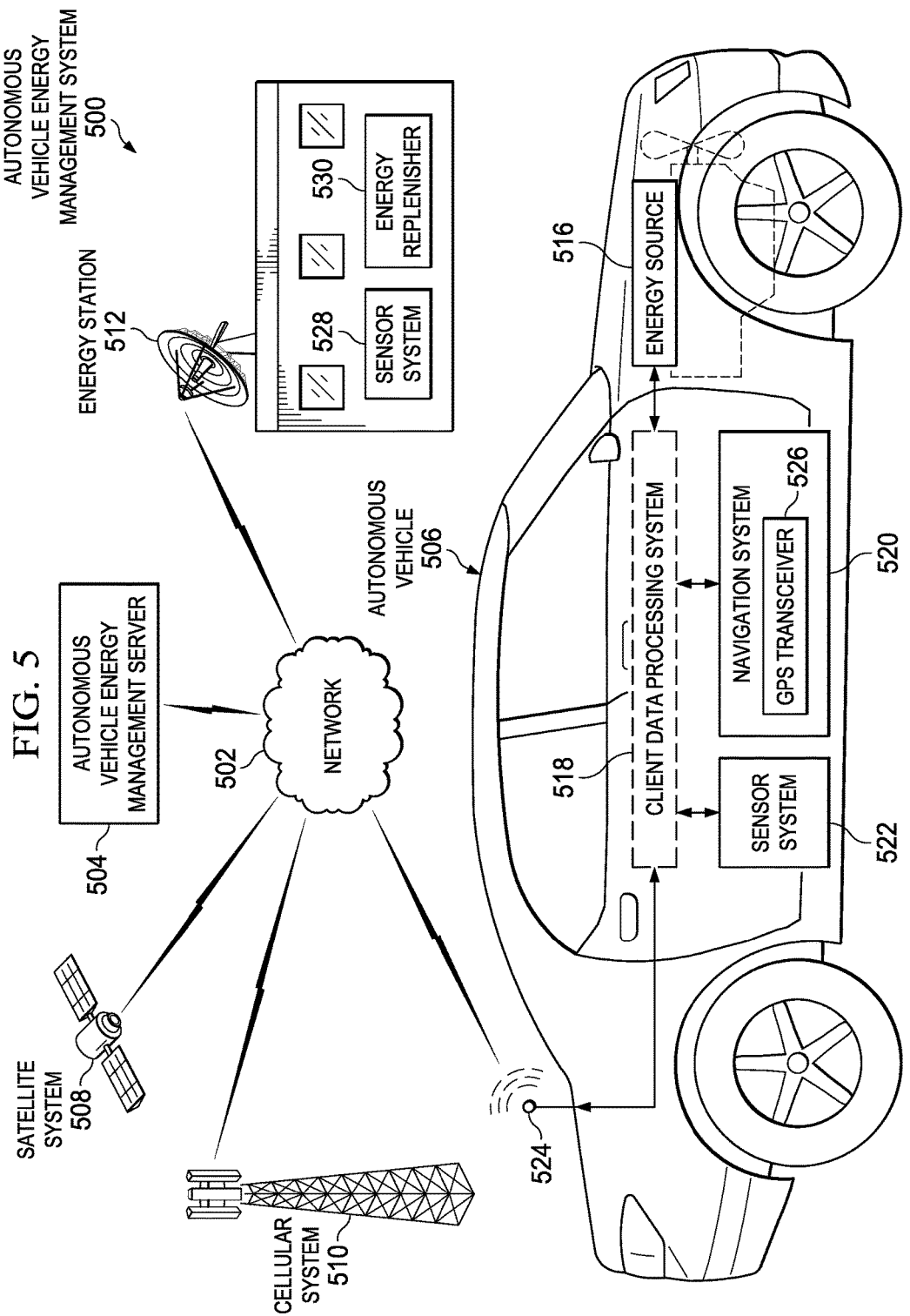
FIG. 5 is a diagram of an example autonomous vehicle energy management system in accordance with an illustrative embodiment.

With reference now to FIG. 5, a diagram of an example autonomous vehicle energy management system is depicted in accordance with an illustrative embodiment. Autonomous vehicle energy management system 500 may be implemented in, for example, a network of data processing systems, such as network data processing system 100 in FIG. 1 or in a cloud computing environment, such as cloud computing environment 300 in FIG. 3.

In this example, autonomous vehicle energy management system 500 includes network 502, autonomous vehicle energy management server 504, autonomous vehicle 506, satellite system 508, cellular system 510, and energy station 512. Network 502 may be, for example, network 102 in FIG. 1. Network 502 provides communication between the different systems of autonomous vehicle energy management system 500.

Autonomous vehicle energy management server 504 monitors and manages one or more registered autonomous vehicles, such as autonomous vehicle 506, in need of replenishing an onboard energy source within a defined geographic area and directs the registered autonomous vehicles to one or more selected energy stations, such as energy station 512, that will minimize energy replenishment times to meet travel destination time constraints defined by passengers of the registered autonomous vehicles. Autonomous vehicle energy management server 504 may be, for example, server 104 in FIG. 1, data processing system 200 in FIG. 2, or a cloud computing node in cloud computing nodes 310 in FIG. 3. In addition, autonomous vehicle energy management server 504 may represent a plurality of autonomous vehicle energy management server computers connected to network 502.

Autonomous vehicle 506 may be, for example, client 110 in FIG. 1. In this example, autonomous vehicle 506 includes energy source 516, client data processing system 518, navigation system 520, sensor system 522, and antenna 524. Energy source 516 supplies energy to propel autonomous vehicle 506. Energy source 516 may be, for example, electricity stored in a set of one or more batteries of an electric engine autonomous vehicle or any type of combustible fuel, such as gasoline, diesel fuel, compressed natural gas, compressed hydrogen, and the like, stored in a fuel tank or reserve of a combustion engine autonomous vehicle.

Client data processing system 518 may be, for example, local computing device 320N in FIG. 3. Client data processing system 518 is a client of autonomous vehicle energy management server 504. Client data processing system 518 provides the data processing capabilities of autonomous vehicle 506 and is communicatively coupled to energy source 516, navigation system 520, sensor system 522, and antenna 524.

Navigation system 520 includes GPS transceiver 526. GPS transceiver 526 provides geo-location coordinates for identification of the current geographic location of autonomous vehicle 506. A passenger of autonomous vehicle 506 may manually enter information, such as, for example, travel destination, travel route, and travel destination time constraints, and the like, in navigation system 520. Navigation system 520 may communicate the geo-location coordinates, travel destination, travel route, and travel destination time constraint information to autonomous vehicle energy management server 504 via network 502.

Sensor system 522 may include, for example, an energy level sensor that is capable of determining a current energy level of energy source 516. Sensor system 522 also may be capable of determining the energy consumption rate of autonomous vehicle 506. Sensor system 522 may communicate this current energy level and consumption rate data to autonomous vehicle energy management server 504 via network 502 as well.

Autonomous vehicle 506 may use antenna 524 to send data to and receive data from autonomous vehicle energy management server 504, satellite system 508, cellular system 510, and energy station 512. Even though antenna 524 is depicted as an external antenna in this example, antenna 524 may be an internal antenna located in, for example, a communication unit within client data processing system 518. Further, it should be noted that any form of wireless communication, such as, for example, radio transmission, microwave transmission, cellular telephone transmission, wireless Web transmission, Wi-Fi transmission, Bluetooth transmission, or any combination thereof, may be employed for communication purposes within and between the different components comprising autonomous vehicle energy management system 500.

Satellite system 508 may be, for example, a network of global positioning system (GPS) satellites. GPS is a satellite-based radio navigation system. GPS is designed so that signals from at least four satellites are available anywhere on earth, which are sufficient to compute the current location of a GPS transceiver, such as GPS transceiver 526.

Cellular system 510 may be, for example, a network of regional, national, or global cellular telephone equipment provided by a public or private telecommunications carrier. The cellular telephone equipment may include, for example, a network of cell towers and/or satellites. Autonomous vehicle 506 may use cellular system 510 for sending and receiving data, as well as for voice and textual communication purposes. In addition, autonomous vehicle energy management server 504 may use the network of cellular telephone equipment of cellular system 510 to receive geographic data, such as, for example, current location of autonomous vehicle 506 if necessary. This geographic data provided by cellular system 510 may provide temporary geographic data input when, for example, data signals from satellite system 508 are not available.

Energy station 512 is a location where autonomous vehicle 506 may replenish onboard energy source 516. In this example, energy station 512 includes sensor system 528 and energy replenisher 530. Sensor system 528 may include a set of sensors capable of determining, for example, number of autonomous vehicles currently replenishing energy, number of autonomous vehicles waiting to replenish energy, number of energy replenishers available for immediate use, and current energy replenishing rates of different autonomous vehicles at energy replenishers. Energy station 512 may utilize the sensor data obtained from sensor system 528 to determine queue times or scheduling times for autonomous vehicles to replenish energy. Energy station 512 may transmit the queue times to autonomous vehicle energy management server 504 via network 502. Energy replenisher 530 is a device capable of replenishing the energy level of energy source 516. For example, energy replenisher 530 may be a battery charger or a combustible fuel pump. In addition, energy replenisher 530 represents a set of one or more energy replenishers at energy station 512.

Figure 6:
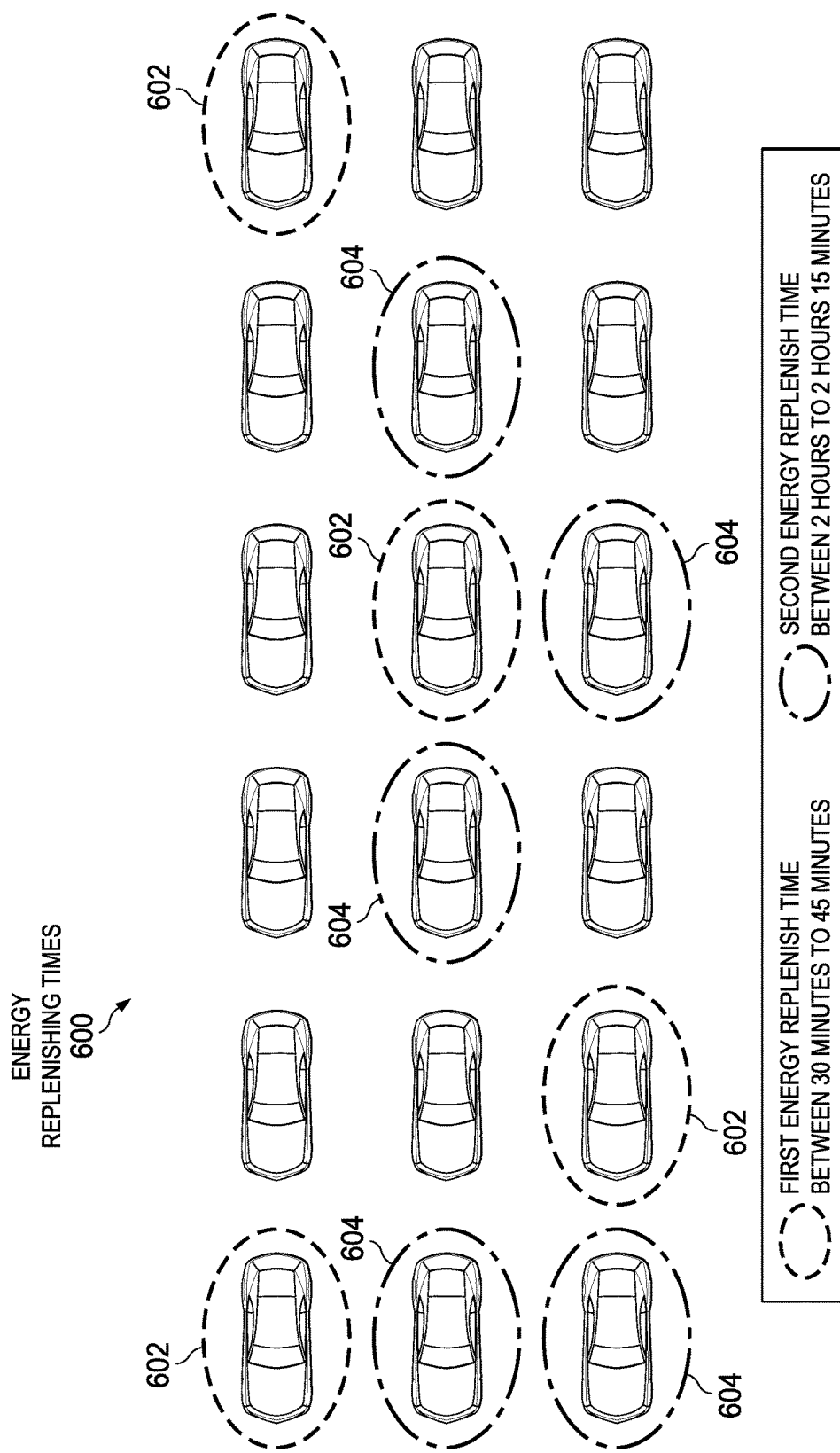
FIG. 6 is an example of energy replenishing times in accordance with an illustrative embodiment.

With reference now to FIG. 6, an example of energy replenishing times is depicted in accordance with an illustrative embodiment. Energy replenishing times 600 include first energy replenish time 602 and second energy replenish time 604. A server, such as autonomous vehicle energy management server 504 in FIG. 5, ranks the registered autonomous vehicles based on current time to replenish energy.

In this example, first energy replenish time 602 is between 30 minutes and 45 minutes for correspondingly indicated autonomous vehicles. Second energy replenish time 604 is between 2 hours and 2 hours, 15 minutes for correspondingly indicated autonomous vehicles. Based on the current time to replenish energy for corresponding autonomous vehicles, the server assigns an appropriate energy station. The server assigns the autonomous vehicles to an appropriate energy station in such a way that there is no or minimum queue time to replenish energy.

Figure 7:
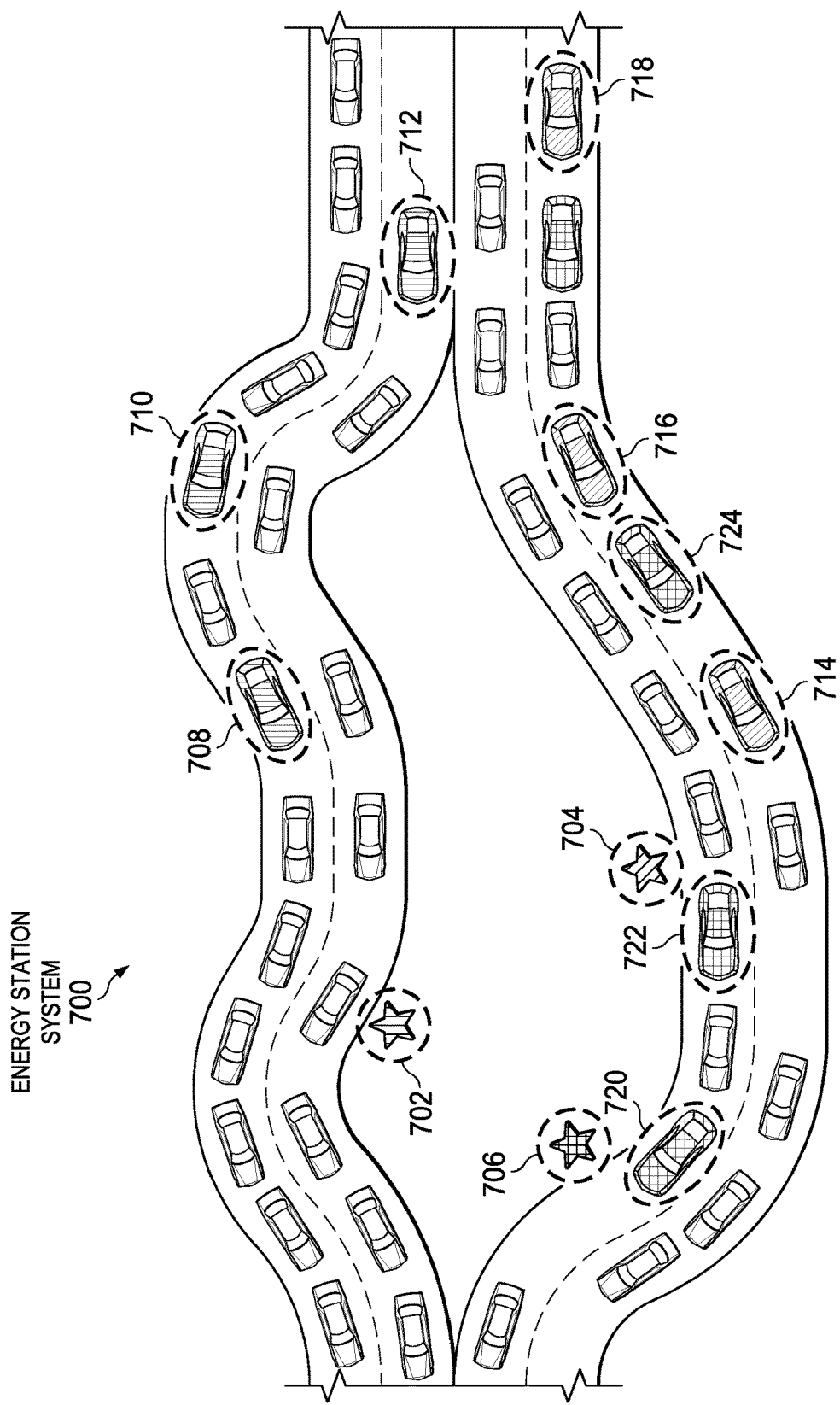
FIG. 7 is a diagram of an example energy station system in accordance with an illustrative embodiment.

With reference now to FIG. 7, a diagram of an example energy station system is depicted in accordance with an illustrative embodiment. Energy station system 700 includes energy station 702, energy station 704, and energy station 706. A server, such as autonomous vehicle energy management server 504 in FIG. 5, automatically assigns registered autonomous vehicles needing to replenish an onboard energy source to a particular energy station so that no or minimal queue time exists based on vehicle ranking. The server proactively schedules a slot for each autonomous vehicle needing energy replenishment at the selected energy station and ensures there is no or minimum queue time.

In this example, the server assigns registered autonomous vehicles 708, 710, and 712 to energy station 702. In addition, the server assigns registered autonomous vehicles 714, 716, and 718 to energy station 704. Further, the server assigns registered autonomous vehicles 720, 722, and 724 to energy station 706.

Figure 8:
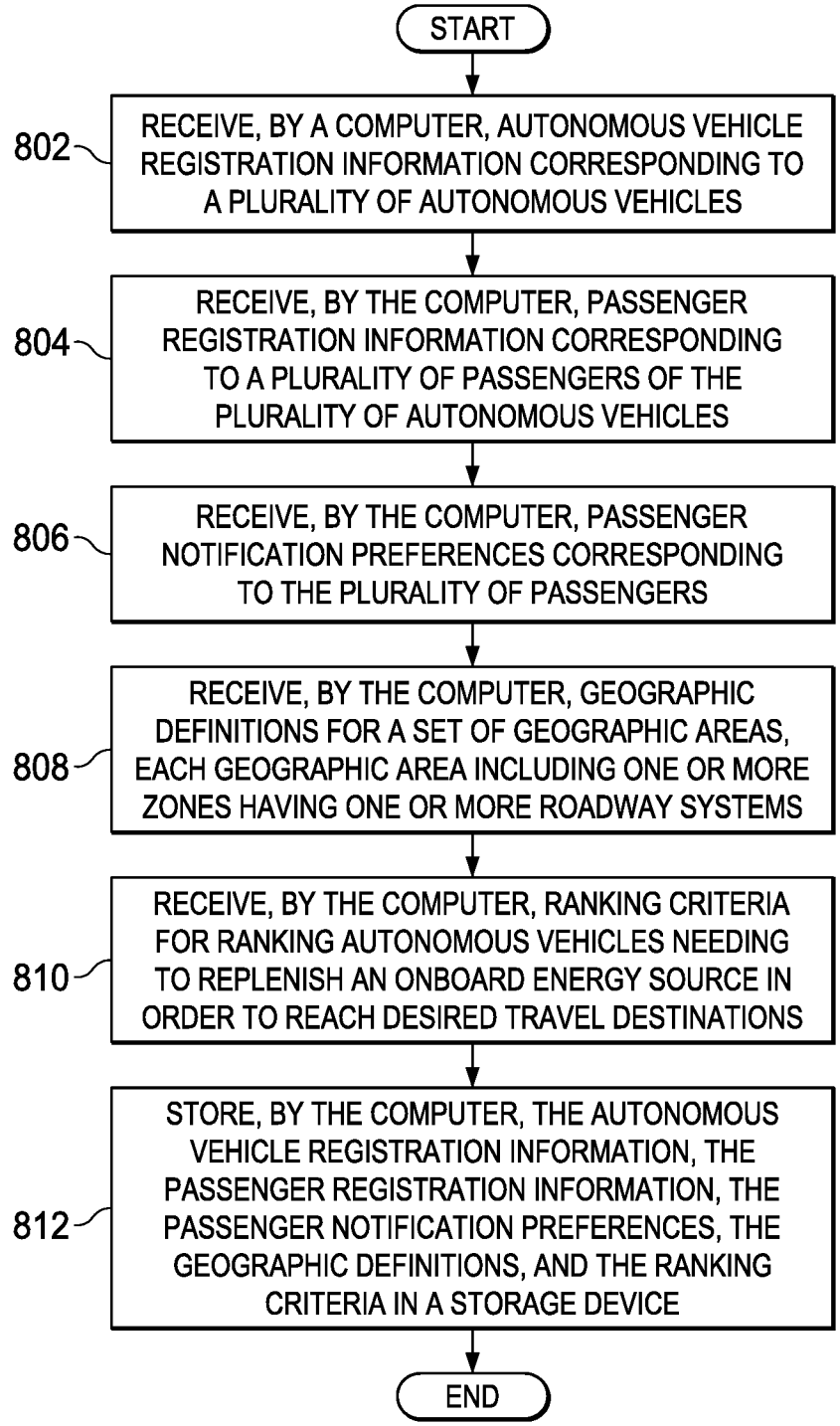
FIG. 8 is a flowchart illustrating a process for storing data in accordance with an illustrative embodiment.

With reference now to FIG. 8, a flowchart illustrating a process for storing data is shown in accordance with an illustrative embodiment. The process shown in FIG. 8 may be implemented in a computer, such as, for example, server 104 in FIG. 1, data processing system 200 in FIG. 2, a cloud computing node in cloud computing nodes 310 in FIG. 3, and autonomous vehicle energy management server 504 in FIG. 5.

The process begins when the computer receives autonomous vehicle registration information corresponding to a plurality of autonomous vehicles (step 802). The autonomous vehicle registration information may be, for example, autonomous vehicle registration information 220 in FIG. 2, and may include vehicle identifiers and specification data. In addition, the computer receives passenger registration information corresponding to a plurality of passengers of the plurality of autonomous vehicles (step 804). The passenger registration information may be, for example, passenger registration information 222 in FIG. 2, and may include passenger identifiers and profiles.

Further, the computer receives passenger notification preferences, such as, for example, notification preferences 250 in FIG. 2, corresponding to the plurality of passengers (step 806). Furthermore, the computer receives geographic definitions for a set of geographic areas, each geographic area including one or more zones having one or more roadway systems (step 808). The geographic definitions for the set of geographic areas may be, for example, geographic area definitions 224 that include zones 252 with roadway systems 254 in FIG. 2.

Moreover, the computer receives ranking criteria for ranking autonomous vehicles needing to replenish an onboard energy source in order to reach desired travel destinations (step 810). The ranking criteria for ranking autonomous vehicles needing to replenish an onboard energy source may be, for example, autonomous vehicle ranking criteria 226 that includes weighting factors 256 in FIG. 2. The computer stores the autonomous vehicle registration information, the passenger registration information, the passenger notification preferences, the geographic definitions, and the ranking criteria in a storage device (step 812). The storage device may be, for example, storage 108 in FIG. 1 or persistent storage 208 in FIG. 2.

With reference now to FIG. 9, a flowchart illustrating a process for managing autonomous vehicles that need to replenish an onboard energy source within a defined geographic area is shown in accordance with an illustrative embodiment. The process shown in FIG. 9 may be implemented in a computer, such as, for example, server 104 in FIG. 1, data processing system 200 in FIG. 2, a cloud computing node in cloud computing nodes 310 in FIG. 3, and autonomous vehicle energy management server 504 in FIG. 5.

The process begins when the computer retrieves, via a network, current energy level data and travel data from each registered autonomous vehicle of a plurality of registered autonomous vehicles in a defined geographic area (step 902). The current energy level data and travel data from each registered autonomous vehicle of the plurality of registered autonomous vehicles in the defined geographic area may be, for example, current energy level data 260 and travel data 262 corresponding to autonomous vehicles in list of autonomous vehicles in a particular geographic area 228 in FIG. 2.

After retrieving the current energy level data and travel data in step 902, the computer calculates whether each registered autonomous vehicle needs energy source replenishment to reach a desired travel destination in the travel data based on the current energy level data corresponding to each registered autonomous vehicle, such as calculated travel distances at current energy levels 264 in FIG. 2 (step 904). Subsequently, the computer makes a determination as to whether one or more autonomous vehicles of the plurality of registered autonomous vehicles in the defined geographic area need to replenish an onboard energy source in order to reach the desired travel destination in the travel data based on the current energy level data corresponding to the one or more autonomous vehicles (step 906). If the computer determines that no autonomous vehicles of the plurality of registered autonomous vehicles in the defined geographic area need to replenish an onboard energy source in order to reach the desired travel destination in the travel data, no output of step 906, then the process returns to step 902 where the computer continues to retrieve current energy level data and travel data from each registered autonomous vehicle.

If the computer determines that one or more autonomous vehicles of the plurality of registered autonomous vehicles in the defined geographic area need to replenish an onboard energy source in order to reach the desired travel destination in the travel data based on the current energy level data corresponding to the one or more autonomous vehicles, yes output of step 906, then the computer ranks the one or more autonomous vehicles needing to replenish the onboard energy source using ranking criteria to prioritize scheduling of the one or more autonomous vehicles at an energy station in the defined geographic area (step 908). The ranking criteria may be, for example, autonomous vehicle ranking criteria 226 with weighting factors 256 in FIG. 2.

Further, the computer transmits, via the network, routing information to the energy station and prioritized scheduling at the energy station to the one or more autonomous vehicles needing to replenish the onboard energy source (step 910). The computer also transmits, via the network, a notification of an energy replenishing event at the energy station with an indication as to whether passenger-defined travel destination time constraints will be met or not to registered passengers of the one or more autonomous vehicles needing to replenish the onboard energy source based on the prioritized scheduling at the energy station and notification preferences corresponding to the registered passengers (step 912). The passenger-defined travel destination time constraints may be, for example, passenger-defined travel destination time constraints 272 in FIG. 2. Thereafter, the process returns to step 902 where the computer continues to retrieve current energy level data and travel data from each registered autonomous vehicle.

Thus, illustrative embodiments of the present invention provide a computer-implemented method, computer system, and computer program product for managing multiple registered autonomous vehicles needing to replenish an onboard energy source within a defined geographic area and directing the autonomous vehicles to one or more selected energy stations that will minimize energy replenishment times to meet passenger-defined travel destination time constraints. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing autonomous vehicles, the computer-implemented method comprising:

collecting, by a computer, autonomous vehicle energy data and travel data;

determining, by the computer, a plurality of autonomous vehicles that need energy replenishment within a defined geographic area;

determining, by the computer, a rank for each of the plurality of autonomous vehicles that need energy replenishment within the defined geographic area to meet passenger-defined travel destination time constraints; and directing, by the computer, each autonomous vehicle to an energy station in a set of energy stations within the defined geographic area to meet the passenger-defined travel destination time constraints based on the rank of each of the plurality of autonomous vehicles.

2. The computer-implemented method of claim 1 further comprising:

calculating, by the computer, whether an autonomous vehicle needs to replenish an onboard energy source to reach a travel destination based on collected autonomous vehicle energy data and travel data corresponding to the autonomous vehicle.

3. The computer-implemented method of claim 2, wherein the onboard energy source is selected from a group consisting of electricity for an electric engine autonomous vehicle and combustible fuel for a combustion engine autonomous vehicle.

4. The computer-implemented method of claim 1, wherein the computer uses the rank of each of the plurality of autonomous vehicles to prioritize scheduling of each autonomous vehicle at the energy station.

5. The computer-implemented method of claim 1 further comprising:

transmitting, by the computer, via a network, routing information to the energy station and prioritized scheduling at the energy station to each autonomous vehicle needing energy replenishment.

6. The computer-implemented method of claim 5 further comprising:

transmitting, by the computer, via the network, a notification of an energy replenishing event at the energy station with an indication as to whether the passenger-defined travel destination time constraints will be met to a passenger of a respective autonomous vehicle needing energy replenishment based on the prioritized scheduling at the energy station.

7. The computer-implemented method of claim 1, wherein the computer collects the autonomous vehicle energy data and travel data from each respective autonomous vehicle in the plurality of autonomous vehicles in real time.

8. The computer-implemented method of claim 1, wherein the energy data includes a current energy level and energy consumption rate of each respective autonomous vehicle.

9. The computer-implemented method of claim 1, wherein the travel data includes travel destination, travel route, and the passenger-defined travel destination time constraints corresponding to each respective autonomous vehicle.

10. The computer-implemented method of claim 1, wherein the computer directs autonomous vehicles to selected energy stations that will minimize energy replenishment times to meet the passenger-defined travel destination time constraints.

11. The computer-implemented method of claim 1, wherein the computer uses ranking criteria and weighting factors to determine the rank and a queue time for each respective autonomous vehicle needing energy replenishment at selected energy stations.

12. The computer-implemented method of claim 1, wherein the defined geographic area includes one or more zones having one or more roadway systems.

13. The computer-implemented method of claim 1, wherein the computer is a server computer in a cloud environment.

\* \* \* \* \*